United States Patent
Andreatti

(10) Patent No.: US 8,920,025 B2
(45) Date of Patent: Dec. 30, 2014

(54) DEVICE FOR REGISTERING THE TEMPERATURE INSIDE A FOODSTUFF PLACED IN AN OVEN

(75) Inventor: Fabrizio Luigi Andreatti, Biandronno (IT)

(73) Assignee: Whirlpool Corporation, Benton Harbor, MI (US)

( * ) Notice: Subject to any disclaimer, the term of this patent is extended or adjusted under 35 U.S.C. 154(b) by 1728 days.

(21) Appl. No.: 12/181,340

(22) Filed: Jul. 29, 2008

(65) Prior Publication Data
US 2008/0279251 A1    Nov. 13, 2008

(51) Int. Cl.
*G01K 1/14* (2006.01)
*G01K 1/02* (2006.01)

(52) U.S. Cl.
CPC .............. *G01K 1/14* (2013.01); *G01K 2207/06* (2013.01); *G01K 1/028* (2013.01)
USPC ............ 374/149; 374/100; 374/208; 116/216

(58) Field of Classification Search
CPC ........... G01K 1/024; G01K 1/14; G01K 1/02; G01K 5/70
USPC ........... 374/149, 141, 100, 208, 163; 116/216
See application file for complete search history.

(56) References Cited

U.S. PATENT DOCUMENTS

| | | | | |
|---|---|---|---|---|
| 1,652,838 A | * | 12/1927 | Rider | 374/134 |
| 1,926,808 A | * | 9/1933 | Hastings | 248/691 |
| 3,394,593 A | * | 7/1968 | Foster et al. | 374/120 |
| 3,504,544 A | * | 4/1970 | Tymkewicz | 374/155 |
| 3,611,336 A | * | 10/1971 | Chen | 374/149 |
| 4,036,995 A | * | 7/1977 | Koether et al. | 426/233 |
| 4,230,731 A | * | 10/1980 | Tyler | 426/233 |
| 4,348,870 A | * | 9/1982 | Stein et al. | 62/140 |
| 4,884,626 A | * | 12/1989 | Filipowski | 165/231 |
| 7,128,466 B2 | * | 10/2006 | Chang et al. | 374/141 |
| 7,722,248 B1 | * | 5/2010 | Chapman et al. | 374/155 |
| 2003/0202558 A1 | * | 10/2003 | Chung et al. | 374/155 |
| 2006/0203878 A1 | * | 9/2006 | Pearl et al. | 374/141 |
| 2007/0041864 A1 | * | 2/2007 | Forsyth et al. | 422/1 |

FOREIGN PATENT DOCUMENTS

EP    1275945 A1    1/2003
WO    WO 8704788 A  *  8/1987

OTHER PUBLICATIONS

Merriam-Webster on line: the definition of the term "hook", 2 pages, printed Sep. 12, 2011.*

* cited by examiner

*Primary Examiner* — Gail Kaplan Verbitsky

(57) ABSTRACT

An electronic device, suitable for registering the temperature of a foodstuff in a oven provided with a door with a handle is disclosed. The device includes a casing with a user interface and a temperature probe suitable for being inserted into the food. The casing includes hook for connecting the device to the oven door, preferably to its handle.

19 Claims, 2 Drawing Sheets

DEVICE FOR REGISTERING THE TEMPERATURE INSIDE A FOODSTUFF PLACED IN AN OVEN

BACKGROUND OF THE INVENTION

1. Field of the Invention

The present invention concerns an electronic device suitable for registering temperature, and in particular a device suitable for monitoring the temperature of a foodstuff placed inside an oven provided with a door with a handle.

2. Description of the Related Art

It is useful to include in a conventional domestic oven a device suitable for monitoring the temperature inside the oven and registering the effective temperature of a foodstuff placed inside it, and to be able to display said temperatures on a user interface at the same time.

The use of electronic devices suitable for monitoring the internal temperature of food during cooking is well known in the field of domestic ovens. An example of a system suitable for monitoring the cooking of the food inside an oven is known from EP 1275945, which describes a device comprising a first temperature sensor to be inserted into the food, a second sensor for monitoring the temperature of the air inside the oven and a user interface connected to said sensors by a cable or by wireless transmission. No reference is provided either as to the location of the device or to the system for fixing the same to the oven.

SUMMARY OF THE INVENTION

An aspect of the present invention is to provide an inexpensive electronic device of the type specified at the beginning of the description that is easy to connect to and remove from the oven, in order to facilitate cleaning and/or maintenance. This aspect is achieved through the characteristics specified in the attached claims. The device according to the invention comprises a user interface provided with a casing and a temperature probe suitable for being inserted into the food, the casing further comprising fixing means for a mobile connection for the device to the handle of the oven.

The presence of a electric connection lead necessary for transmitting data from the temperature sensor to the user interface (the preferred solution because of its cost, which is less than a wireless solution) makes it convenient, in order to reduce the length of the lead, to locate the user interface the shortest possible distance from said oven. The present invention provides for the user interface to be provided with a casing with a portion being substantially C-shaped in order to allow the device to hook on to the oven door and preferably to the horizontal handle of the oven.

Another aspect of the device according to the invention provides for part of the casing to comprise magnetic material in order to allow connection between the device and a metallic element of the oven door.

According to yet another aspect of the device a switch can be provided for selecting the temperature display in degrees Fahrenheit or degrees centigrade.

Another aspect of the device according to the invention provides for the temperature probe to comprise a first sensor suitable for registering the temperature inside the food and a second sensor suitable for registering the temperature within the oven, and for the temperatures to be displayed simultaneously or alternately on the user interface.

BRIEF DESCRIPTION OF THE DRAWINGS

Further advantages and characteristics of a device according to the invention will be obvious from the following detailed description, provided purely by way of non-restrictive example, with reference to the attached drawings in which.

DETAILED DESCRIPTION OF THE PREFERRED EMBODIMENTS

Figure 1:
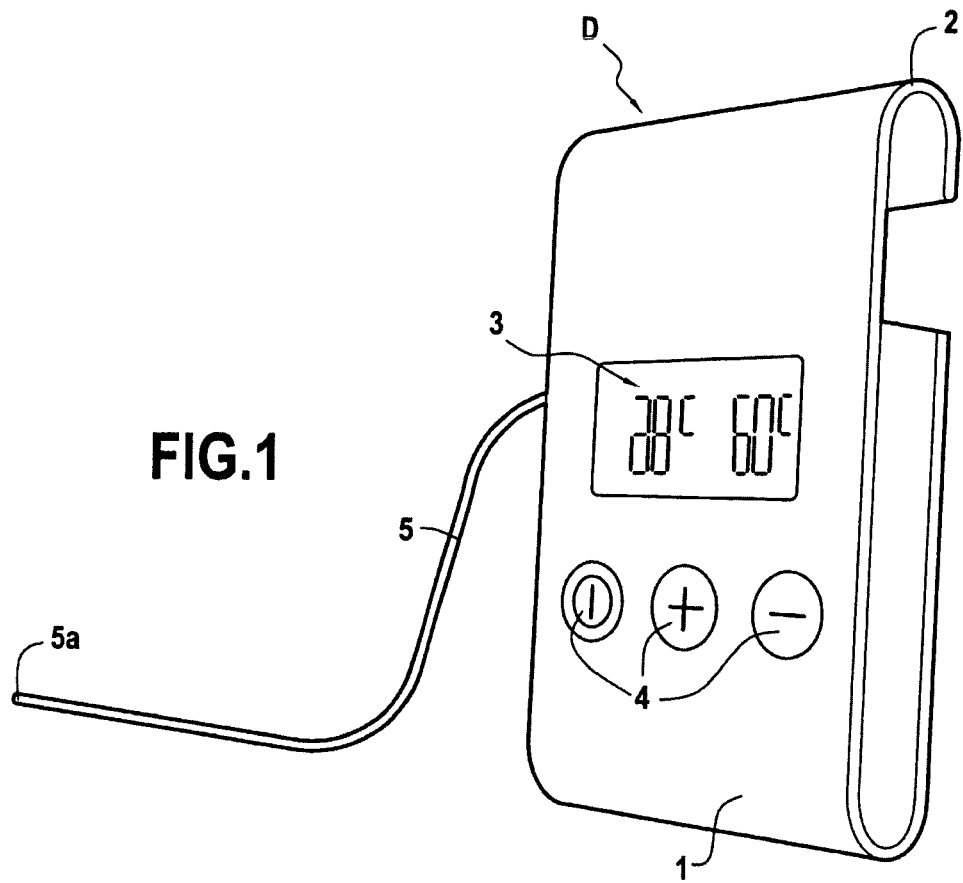
FIG. 1 is a perspective view of the device according to the invention.
Figure 5:
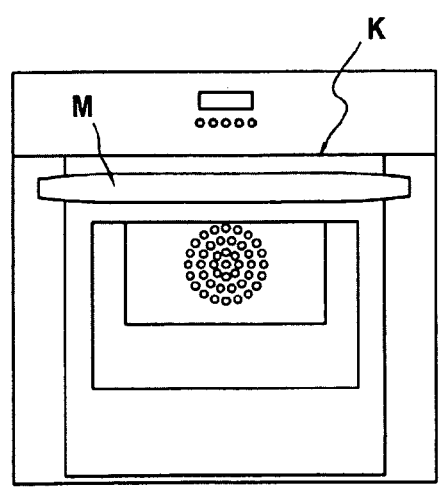
FIG. 5 is a front view of a traditional oven provided with a door with a handle to which the device according to the invention is applicable.

FIG. 1 illustrates a device D according to the invention comprising a parallelepipedal-shaped casing 1 having a substantially C-shaped upper part 2 for the purpose of allowing the device to hook on to an oven handle M (FIG. 5), a user interface 3 ("display"), a button panel 4, an electrical connection lead 5, and a temperature probe 5a.

Figure 2:
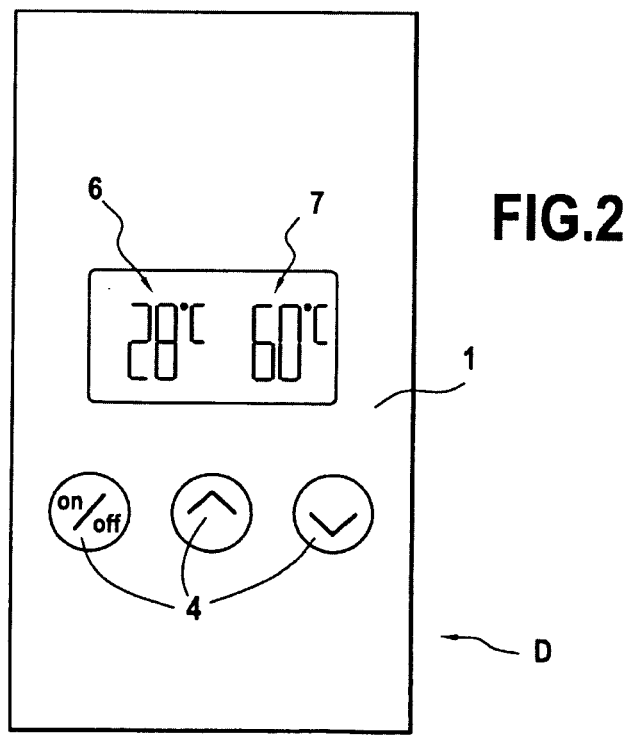
FIG. 2 is a front view of the device in FIG. 1.

In FIG. 2 the user interface 3 provides for the simultaneous display of a first temperature 6 transmitted from the probe 5a suitable for registering the temperature inside the food (for example a roast joint of meat) and a second temperature 7 transmitted from a second sensor of the probe 5a suitable for registering the temperature within the oven.

Figure 3:
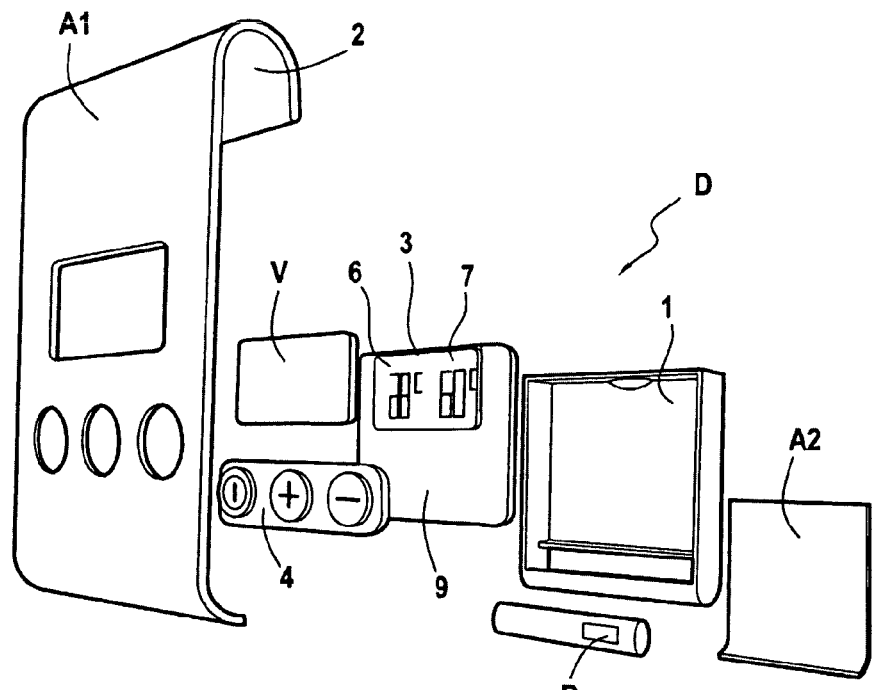
FIG. 3 is an exploded perspective view of the device.

FIG. 3 clearly shows the casing 1 which, in its upper part 2, is substantially C-shaped in order to allow the device to hook on to the oven handle M. Alternatively, the upper part 2 can be shaped in such a way as to allow the device D to hook directly on to an upper edge K (FIG. 5) of the oven door.

Figure 4:
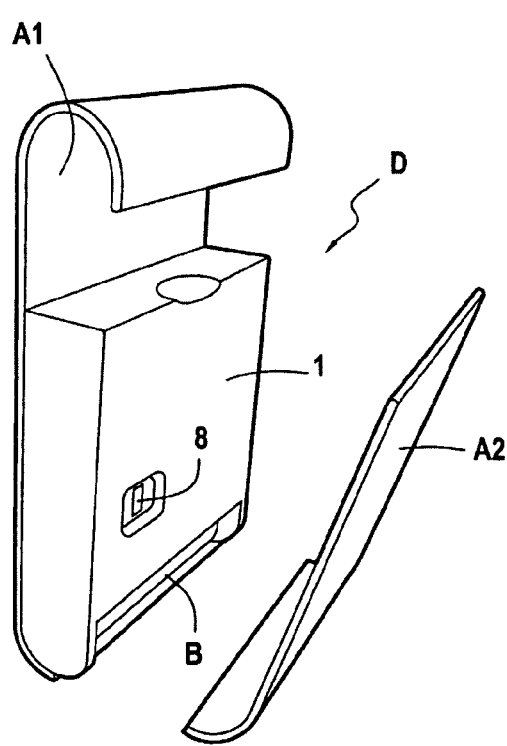
FIG. 4 is a perspective view that illustrates the closure of the battery compartment of the device.

FIG. 4 is an exploded view of the device according to the invention comprising an outer front shell A1, a switch 8 for selecting the temperature display in degrees Fahrenheit or degrees centigrade (FIG. 4), an electronic control unit 9, a removable battery B, a glass plate V and an outer rear shell A2, which also acts as a battery cover. The outer rear shell A2 (FIG. 4) can be clicked on to the device D.

The electronic control unit 9 also provides a function of presetting the desired temperature. This function allows the user to select the desired internal temperature of the food; when this value is reached an acoustic signal integrated into the device will inform the user that the desired value has been reached.

An examination of the characteristics of the device according to the invention will make apparent the ease, for the user, either of applying the device to the oven door, or of removing it from the door for cleaning, replacing flat batteries and ordinary maintenance. Moreover, the hook-type configuration of a portion of the device also allows it to be securely supported even when the oven door is in its open configuration, at the same time allowing continuous display of the temperature of the food even when the door is open.

Another aspect of the device according to the invention is that it can be used on any type of electric or gas oven, irrespective of the type of temperature control used in the oven.

I claim:

1. A portable electronic temperature registering device for use with an oven having a door including an upper edge portion and a handle comprising:
   a casing including a hook portion, said casing being adapted to be hung on one of the tipper edge portion and the handle of the door by the hook portion such that the casing is movable with the door, While enabling the casing to be-readily unhooked from the door;

an electronic control unit provided in the casing;

a temperature probe in electrical communication with the electronic control unit, said temperature probe including a first temperature sensor adapted to be inserted into a food product to register an internal temperature of the food product; and a user interface located on the casing and linked to the electronic control unit, said user interface including a temperature display configured on figured to display the internal temperature of the food product.

2. The device according to claim 1, wherein the temperature probe further includes a second temperature sensor configured to register a temperature within the oven.

3. The device according to claim 2, wherein the internal temperature of the food product and the temperature within the oven can be simultaneously displayed on said temperature display.

4. The device according to claim 1, further comprising: a switch enabling a user to select between displaying the internal temperature of the food product in degrees Fahrenheit or degrees Centigrade.

5. The device according to claim 1, wherein the casing further includes an outer rear shell including magnetic material adapted to connect the casing to a metallic element of an oven door to further support the electronic temperature registering device.

6. The device according to claim 1, wherein the User interface further includes a plurality of buttons enabling a user to select a desired internal food temperature.

7. The device according to claim 6, further comprising: an alarm configured to inform a user when the desired internal food temperature has been reached.

8. The device according to claim 1, wherein the hook portion is constituted by an upper C-shaped portion of the casing.

9. The device according to claim 1, wherein the casing comprises a front shell and a rear shell connected together.

10. A. cooking appliance comprising:

an oven cavity;

a door for selectively closing the oven cavity, said door including an upper edge portion and a handle adapted to be grasped by a user fat manually shifting the door relative to the oven cavity; and a portable electronic temperature registering device including:

a casing including a hook portion, said casing being hung on one of the upper edge portion and the handle of the door by the hook portion such that the casing is movable with the door, even when the electronic temperature registering device is in use, while enabling the casing to be readily unhooked from the door;

an electronic control unit provided in the casing;

a temperature probe in electrical communication with the electronic control unit, said temperature probe including a first temperature sensor adapted to be inserted into a food product to register an internal temperature of the food product; and a user interface, located on the casing and linked to the electronic control unit, said user interface including a temperature display configured to display the internal food temperature of the food product.

11. The cooking appliance according to claim 10, wherein the temperature probe further includes a second temperature sensor configured to register a temperature within the oven.

12. The cooking appliance according to claim 11, wherein the internal temperature of the food product and the temperature within the oven are simultaneously displayed on said temperature display.

13. The cooking appliance according to claim 10, further comprising: a switch enabling a user to select between displaying the internal temperature of the food product in degrees Fahrenheit or degrees Centigrade.

14. The cooking appliance according to claim 10, wherein the door includes a metallic element and the casing further includes an outer rear shell including magnetic material connecting the casing to the metallic element of the door to further support the electronic temperature registering device on the cooking appliance.

15. The cooking appliance according to claim 10, wherein the use interface further includes a plurality of buttons enabling a user to select a desired internal food temperature.

16. The cooking appliance according to claim 15, further comprising: an alarm configured to inform a user when the desired internal food temperature has been reached.

17. The cooking appliance according to claim 10, wherein the hook portion is constituted by an upper C-shaped portion of the casing.

18. The cooking appliance according to claim 10, wherein the casing comprises a front shell and a rear shell connected together.

19. The cooking, appliance according to claim 10, further comprising: a wire linking the temperature probe to the electronic control unit, said wire being routed around a portion of the door and into the oven cavity during use of the electronic temperature registering device.

* * * * *